United States Patent [19]
Sato

[11] Patent Number: 5,126,884
[45] Date of Patent: Jun. 30, 1992

[54] COMPACT WIDE-ANGLE ZOOM LENS

[75] Inventor: Susumu Sato, Chiba, Japan

[73] Assignee: Nikon Corporation, Tokyo, Japan

[21] Appl. No.: 655,074

[22] Filed: Feb. 14, 1991

[30] Foreign Application Priority Data

Feb. 19, 1990 [JP] Japan .................. 2-37679

[51] Int. Cl.⁵ .................................................. G02B 15/14
[52] U.S. Cl. .................................................. 359/692
[58] Field of Search .................. 350/423, 426, 427; 359/692

[56] References Cited

U.S. PATENT DOCUMENTS 4,756,608  7/1988  Itoh .............................. 350/427
4,883,346  11/1989  Aoki et al. ..................... 350/423
4,911,539  3/1990  Tsunashima et al. ............ 350/423

Primary Examiner—Scott J. Sugarman
Attorney, Agent, or Firm—Shapiro and Shapiro

[57] ABSTRACT

In a compact wide-angle zoom lens which has, in succession from the object side, a first lens unit of positive refractive power and a second lens unit of negative refractive power and in which a magnification change is effected by the relative unit spacing between the two lens units being varied, the first lens unit has at least two negative lens components and at least one positive lens component, and one of the at least two negative lens components is disposed most adjacent to the object side of the first lens unit, and has a negative meniscus shape having its convex surface facing the object side.

9 Claims, 1 Drawing Sheet

COMPACT WIDE-ANGLE ZOOM LENS

BACKGROUND OF THE INVENTION

1. Field of the Invention

This invention relates to a wide-angle zoom lens containable in a compact camera, an electronic still camera or the like.

2. Related Background Art

A two-unit type zoom lens of convex-concave construction is known as a conventional zoom lens for a compact camera, and a number of such two-unit type zoom lenses of convex-concave construction have been put into practical use.

As regards the range of the focal length of the conventional two-unit type zoom lens of convex-concave construction, zoom lenses of the order of 35 mm-70 mm as converted into the film size of 35 mm format have been the mainstream.

Also, the zoom lens of this type has few limitations in the back focal length thereof and basically adopts a construction comprising a positive first lens unit $G_1$ and a negative second lens unit $G_2$, with the lens in the first lens unit $G_1$ which is most adjacent to the object side comprised of a positive lens. By such construction, the back focal length is shortened and the compactness of the entire lens is achieved.

However, if an attempt is made to achieve a wide angle of view on the basis of this construction, not only will it become difficult to secure a back focal length great enough to be capable of coping with a compact camera or the like, but also it will become difficult to correct aberrations sufficiently.

For this reason, the focal length of the wide angle end of the conventional two-unit type zoom lens of convex-concave construction has been of the order of 35 mm as described above, and in most cases, this has been 63.4 degrees at greatest when converted into an angle of view.

SUMMARY OF THE INVENTION

The present invention has been made in view of the above-noted problem and an object thereof is to provide a compact wide-angle zoom lens which realizes a wide angle of view, a high zoom ratio and compactness and yet secures a sufficient back focal length and has an excellent imaging performance.

To achieve the above object, the present invention provides a zoom lens which, as shown in FIG. 1 of the accompanying drawing, has in succession from the object side a first lens unit $G_1$ of positive refractive power and a second lens unit $G_2$ of negative refractive power and in which the relative unit spacing between said two lens units is varied to effect a magnification change and wherein said first lens unit $G_1$ has at least two negative lens components and at least one positive lens component, and one of said at least two negative lens components is disposed most adjacent to the object side of the first lens unit $G_1$, and this negative lens component has a negative meniscus shape having its convex surface facing the object side.

When on the basis of this basic construction, the magnification change ratio of said wide-angle zoom lens is Z and the focal length of said negative meniscus lens component $L_1$ is $f_{L1}$, it is desirable to satisfy $$Z/|f_{L1}| > 0.06 \quad (1)$$

For the negative meniscus lens component $L_1$, it is preferable to choose a material having an appropriate refractive index, and when the refractive index of said meniscus lens component $L_1$ is $n_{L1}$, it is more desirable to satisfy $$n_{L1} > 1.7 \quad (2)$$

Also, when the maximum image height of said wide-angle zoom lens is h and the focal length of said first lens unit $G_1$ is $f_1$ and the focal length of said second lens unit $G_2$ is $f_2$, it is more preferable to satisfy $$0.5 < f_1/h < 1.1 \quad (3)$$

$$0.5 < |f_2|/h < 1.1. \quad (4)$$

To achieve a wide angle of view and a high magnification at the same time in a two-unit zoom lens of convex-concave construction, the lenses forming each lens unit must be made thick.

So, in the present invention, this is solved by disposing the negative meniscus lens $L_1$ having a strong diverging action and having its convex surface facing the object side most adjacent to the object side of the first lens unit $G_1$ having a positive refractive power.

By such disposition of the negative meniscus lens $L_1$, the position of the principal point of the first lens unit $G_1$ moves more toward the image side and therefore, the unit spacing for zooming formed between the first lens unit $G_1$ and the second lens unit $G_2$ is secured sufficiently.

As a result, the thickening of the first lens unit $G_1$ becomes possible and also the principal point spacing between the lens units is obtained sufficiently and therefore, there is provided a very advantageous construction which can realize a wide angle of view and a high magnification at the same time.

Also, a sufficient back focal length can be secured by the strong negative refractive power of the negative meniscus lens $L_1$ disposed most adjacent to the object side of the first lens unit $G_1$ and having its convex surface facing the object side.

Therefore, the emergence height at which the principal light ray having a great angle of view emerges from the second lens unit $G_2$ becomes low and thus, it becomes possible to make the diameters of the lenses forming the second lens unit $G_2$ small.

Also, in the present invention, the negative lens in the first lens unit $G_1$ which is most adjacent to the object side is formed into a meniscus shape and therefore, there is the tendency that distortion is greatly created in the negative direction by the strong negative refractive power of this negative lens, but nevertheless, the distortion is minimized. Moreover, by this negative lens being formed into a meniscus shape, it becomes possible to make the effective diameter of this lens itself small.

In this negative meniscus lens $L_1$, in addition to said negative distortion, positive spherical aberration tends to occur greatly and therefore, in order to correct this, it is necessary to dispose a positive lens in the first lens unit. Also, in this positive lens and a negative lens constituting the second lens unit $G_2$, positive distortion occurs greatly and therefore, in the first lens unit, it is necessary to correct it by at least one negative lens, in addition to said negative meniscus lens $L_1$.

To achieve a wide angle of view and a high magnification and yet achieve good aberration correction and a sufficient back focal length, it is desirable to satisfy $$Z/f_{L1} > 0.06 \tag{1}$$

where Z is the magnification change ratio of the wide-angle zoom lens, and $f_{L1}$ is the focal length of the negative meniscus lens.

If the range of this condition (1) is exceeded, the power (refractive power) of the negative meniscus lens $L_1$ in the first lens unit $G_1$ which is most adjacent to the object side will become weak and it will become difficult to secure the principal point spacing between the lens units while keeping the first lens unit $G_1$ thickened. Therefore, it will become difficult to thicken the first lens unit $G_1$ to achieve a wide angle of view and a high magnification, and this is not preferable in aberration correction.

Also, the negative meniscus lens $L_1$ in the first lens group $G_1$ in the present invention which is most adjacent to the object side has relatively strong refractive power as described above and therefore, to minimize the amounts of spherical aberration, astigmatism and distortion created in this lens itself, it is desirable to choose a glass material of high refractive index for the negative meniscus lens $L_1$. It is desirable that the optimum range satisfy the following condition when the refractive index of the negative meniscus lens $L_1$ is $n_{L1}$:

$$n_{L1} > 1.7 \tag{2}$$

Also, to sufficiently achieve the compactness, the wide angle of view and the high magnification of the zoom lens, it is necessary that the refractive power of each lens unit be optimally distributed.

So, when the maximum image height of the wide-angle zoom lens is h and the focal length of the first lens unit $G_1$ is $f_1$ and the focal length of the second lens group $G_2$ is $f_2$, it is preferable to satisfy the following conditions at the same time:

$$0.5 < f_1/h < 1.1 \tag{3}$$

$$0.5 < f_2/h < 1.1 \tag{4}$$

If the upper limit of the condition (3) is exceeded, it will become difficult to obtain a desired wide angle of view while maintaining the full length of the lens system short. If conversely, the lower limit of this condition (3) is exceeded, Petzval sum will increase in the positive direction and therefore, not only will the correction of the image plane become difficult, but also spherical aberration will become greatly negative and will become very difficult to correct.

Also, if the upper limit of the condition (4) is exceeded, the refractive power of the second lens unit $G_2$ will become weak and to obtain a sufficient magnification change ratio, the amount of movement of the second lens unit $G_2$ will have to be made great, and this is contrary to the compactness of the lens which is one of the objects of the present invention and therefore, is not preferable. If conversely, the lower limit of this condition (4) is exceeded, positive distortion will become great and it will become difficult to well balance it with negative distortion occurring in the first lens unit $G_1$.

Now, the negative meniscus lens $L_1$ in the first lens unit $G_1$ which is most adjacent to the object side can be decreased to a certain degree in the aberrations created therein by appropriately choosing the kind of the glass material, the shape of the lens, etc. as described above. However, aberrations still remain due to the strong refractive power of this lens itself and particularly, the correction of negative distortion and positive spherical aberration poses a problem.

Therefore, positive spherical aberration occurring in the negative meniscus lens $L_1$ can be corrected more effectively by making a positive lens $L_2$ disposed immediately behind this negative meniscus lens $L_1$ into a shape in which the object side surface thereof is a convex surface facing the object side.

However, this positive lens $L_2$ having its convex surface facing the object side functions to correct chiefly spherical aberration and therefore, positive distortion occurs greatly in this lens $L_2$.

For this reason, positive distortion occurring in this positive lens $L_2$ having its convex surface facing the object side can be corrected more effectively in the entire lens system by making a negative lens $L_3$ disposed immediately behind this positive lens $L_2$ into a shape in which the object side surface thereof is a concave surface facing the object side.

To correct spherical aberration sufficiently by the negative meniscus lens $L_1$ in the first lens unit $G_1$ which is most adjacent to the object side and the positive lens $L_2$ positioned immediately behind it, it is desirable to satisfy the following condition:

$$f_W/f_{L12} < 0.3 \tag{5}$$

where $f_W$ is the focal length of the wide-angle zoom lens at the wide end thereof, and $f_{L12}$ is the combined focal length of the negative meniscus lens $L_1$ in the first lens unit $G_1$ which is most adjacent to the object side and the positive lens $L_2$ positioned immediately behind the image side of the lens $L_1$.

If the range of this condition is exceeded, the combined focal length of the negative meniscus lens $L_1$ and the positive lens $L_2$ will become small and the refractive power of the negative meniscus lens $L_1$ and the refractive power of the positive lens $L_2$ will differ greatly from each other and therefore, not only can spherical aberration not be fully corrected between the two lenses, but also the other aberration balance will be greatly lost. Thus, it will become difficult to construct the first lens unit $G_1$ of a small number of lenses.

Also, to correct the chromatic aberration of the zoom lens of the present invention sufficiently, it is necessary that the dispersion of the negative meniscus lens $L_1$ in the first lens unit having strong negative refractive power be made appropriate.

That is, it is desirable to choose a glass material of low dispersion to a certain degree, as shown in the following condition:

$$\nu_{L1} > 37 \tag{6}$$

where $\nu_{L1}$ is the dispersion of the negative meniscus lens $L_1$ in the first lens unit $G_1$ which is most adjacent to the object side to d-line.

If this condition is departed from, chromatic aberration occurring in the negative meniscus lens $L_1$ in the first lens unit will become tremendous and it will become difficult to correct chromatic aberration by the other lenses.

Further, it is preferable that the shape of the negative meniscus lens $L_1$ in the first lens unit which is most adjacent to the object side be made appropriate, and when the object side and image side radii of curvature of the negative meniscus lens $L_1$ in the first lens unit $G_1$ which is most adjacent to the object side are $r_a$ and $r_b$, respectively, it is desirable to satisfy $$-5.0 < \frac{r_b + r_a}{r_b - r_a} < -1.2. \quad (7)$$

If the lens is designed to satisfy this condition (7), positive distortion occurring in the second lens unit $G_2$ can be corrected well-balanced by negative distortion occurring in the negative meniscus lens $L_1$.

However, if the lower limit of this condition (7) is exceeded, the radii of curvature $r_1$ and $r_2$ will both become too small to obtain the predetermined necessary focal length of the negative meniscus lens $L_1$, and high-order aberrations will occur tremendously and particularly, negative distortion will occur greatly, and this is not preferable. If conversely, the upper limit of this condition is exceeded, the action of the object side convex surface of the negative meniscus lens $L_1$ will become weak, and to make a light ray of a great angle of view enter to thereby achieve a wide angle of view, the lens diameter of this negative meniscus lens $L_1$ will have to be made great, thus resulting in bulkiness of the lens system, and this is not preferable.

As described above, according to the present invention, there can be achieved a compact wide-angle zoom lens which maintains a compact shape and yet has an excellent imaging performance and which can realize a high magnification change ratio and a wide angle of view at the same time.

DESCRIPTION OF THE PREFERRED EMBODIMENTS

Figure 1:
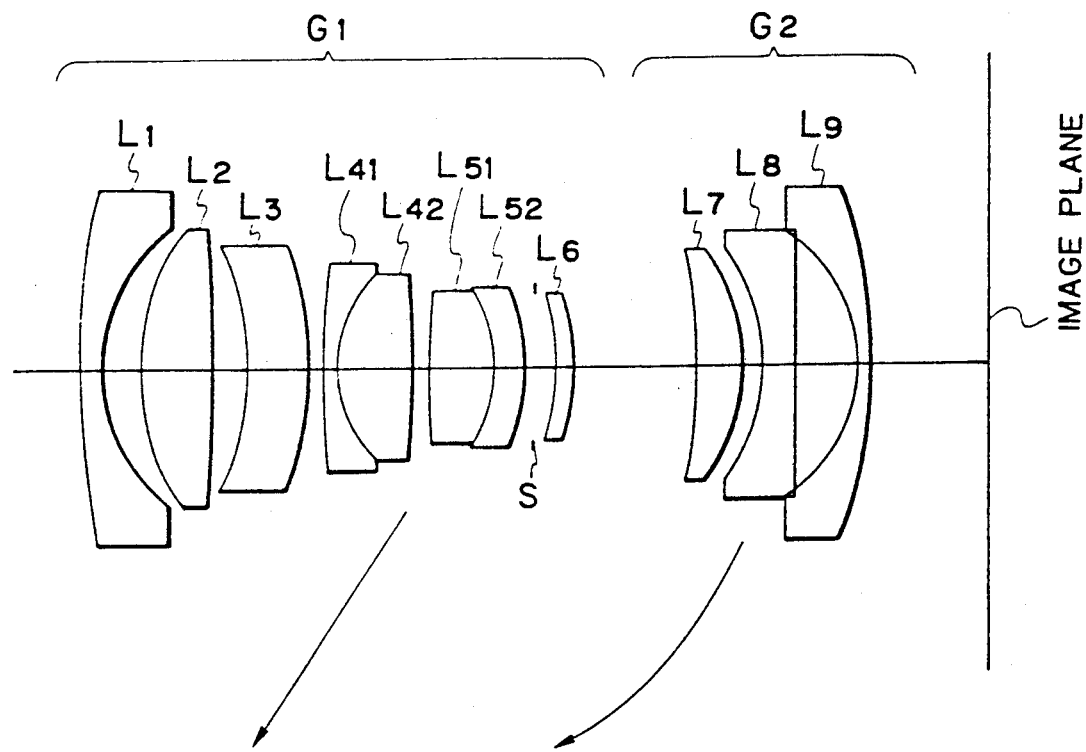
FIG. 1 shows the lens construction according to first to fifth embodiments of the present invention.

Various embodiments of the present invention will hereinafter be described.

FIG. 1 shows the lens construction according to first to fifth embodiments of the present invention, and each of these embodiments has a similar lens construction.

A first lens unit $G_1$ having positive refractive power comprises, in succession from the object side, a negative meniscus lens $L_1$ having its convex surface facing the object side, a positive lens $L_2$ having its convex surface facing the object side, a negative meniscus lens $L_3$ having its concave surface facing the object side, a negative lens $L_{41}$, a positive lens $L_{42}$ cemented thereto and having its surface of sharper curvature facing the object side, a positive lens $L_{51}$ having its convex surface of sharper curvature facing the image side, a negative meniscus lens $L_{52}$ cemented thereto and having its convex surface facing the image side, and a positive meniscus lens $L_6$ having its convex surface facing the image side.

A second lens unit $G_2$ having negative refractive power comprises a positive meniscus lens $L_7$ having its convex surface facing the image side, a negative lens $L_8$ having its concave surface facing the object side, and a negative meniscus lens $L_9$ having its convex surface facing the image side.

As shown in the lens construction view of each embodiment, zooming from the wide angle end to the telephoto end is accomplished by the first lens unit $G_1$ and the second lens unit $G_2$ being moved toward the object side so that the unit spacing between the first lens unit $G_1$ and the second lens unit $G_2$ may be reduced.

A stop S is disposed between the negative meniscus lens $L_{52}$ in the first lens unit having its convex surface facing the image side and the positive meniscus lens $L_6$ having its convex surface facing the image side.

The numerical values of the respective embodiments will be shown below. The numbers at the left end in Tables 1–5 represent the order from the object side, r represents the radius of curvature of each lens surface, d represents the lens surface spacing, the refractive index n and the Abbe number $\nu$ are values for d-line ($\lambda = 587.6$ nm). $f_{L1}$ represents the focal length of the negative meniscus lens $L_1$ in the first lens unit $G_1$ which is most adjacent to the object side, $f_{L12}$ represents the combined focal length of the negative meniscus lens $L_1$ in the first lens unit $G_1$ which is most adjacent to the object side and the positive lens $L_2$ positioned on the image side of the lens $L_1$, $f_1$ represents the focal length of the first lens unit $G_1$, $f_2$ represents the focal length of the second lens unit $G_2$, and h represents the maximum image height of the zoom lens.

TABLE 1

(First Embodiment)

Focal length f: 28.5–68.0.
Angle of view $2\omega$: 73.0°–35.4°.
Full length Dw at the wide angle end: 63.7.
Magnification change ratio Z: 2.39.
Shortest back focal length $Bf_{min}$: 8.18

| | r | d | $\nu$ | n |
|---|---|---|---|---|
| 1 | 52.620 | 1.50 | 45.4 | 1.79668 |
| 2 | 12.324 | 2.80 | | |
| 3 | 17.714 | 4.80 | 38.9 | 1.67163 |
| 4 | −173.449 | 2.50 | | |
| 5 | −20.925 | 4.20 | 45.4 | 1.79668 |
| 6 | −27.098 | 1.30 | | |
| 7 | 59.630 | 1.00 | 40.9 | 1.79631 |
| 8 | 8.970 | 5.20 | 46.5 | 1.58267 |
| 9 | −58.411 | 1.20 | | |
| 10 | 47.490 | 4.60 | 59.0 | 1.51823 |
| 11 | −9.869 | 2.00 | 25.4 | 1.80518 |
| 12 | −13.745 | 2.18 | | |
| 13 | −21.7722 | 1.20 | 59.0 | 1.51823 |
| 14 | −18.012 | (variable) | | |
| 15 | −56.933 | 3.30 | 41.5 | 1.57501 |
| 16 | −14.612 | 1.40 | | |
| 17 | −14.509 | 2.30 | 54.0 | 1.61720 |
| 18 | 2309.522 | 4.40 | | |
| 19 | −11.194 | 1.00 | 47.1 | 1.62374 |
| 20 | −36.683 | (Bf) | | |

| f | 28.5001 | 51.8202 | 68.0004 |
|---|---|---|---|
| d14 | 8.6857 | 2.9291 | 1.2551 |
| Bf | 8.1831 | 32.1582 | 48.7929 |

$f_{L1} = -20.54 \quad f_{L12} = -601.90 \quad h = 21.6$
$f_1 = 18.83 \quad f_2 = -19.36$

TABLE 2

(Second Embodiment)

Focal length f: 28.8–58.5.
Angle of view $2\omega$: 72.2°–40.6°.
Full length Dw at the wide angle end: 63.9.
Magnification change ratio Z: 2.03.
Shortest back focal length $Bf_{min}$: 9.08

| | r | d | 84 | n |
|---|---|---|---|---|
| 1 | 46.166 | 1.50 | 45.4 | 1.79668 |
| 2 | 12.895 | 2.80 | | |
| 3 | 18.885 | 4.80 | 38.2 | 1.65128 |

TABLE 2-continued (Second Embodiment)

Focal length f: 28.8–58.5.
Angle of view 2ω: 72.2°–40.6°.
Full length Dw at the wide angle end: 63.9.
Magnification change ratio Z: 2.03.
Shortest back focal length $Bf_{min}$: 9.08

| | | | | |
|---|---|---|---|---|
| 4 | −106.837 | 2.50 | | |
| 5 | −20.651 | 4.20 | 40.9 | 1.79631 |
| 6 | −27.033 | 1.30 | | |
| 7 | 58.849 | 1.00 | 40.9 | 1.79631 |
| 8 | 10.254 | 5.20 | 46.5 | 1.58267 |
| 9 | −69.455 | 1.20 | | |
| 10 | 50.257 | 4.60 | 56.5 | 1.50137 |
| 11 | −8.928 | 2.00 | 25.4 | 1.80518 |
| 12 | −13.158 | 2.28 | | |
| 13 | −36.427 | 1.20 | 49.1 | 1.53172 |
| 14 | −24.236 | (variable) | | |
| 15 | −51.853 | 3.30 | 45.4 | 1.79668 |
| 16 | −16.420 | 1.40 | | |
| 17 | −15.631 | 2.30 | 51.1 | 1.73350 |
| 18 | −179.827 | 4.00 | | |
| 19 | −12.430 | 1.00 | 51.1 | 1.73350 |
| 20 | −47.047 | (Bf) | | |

| | | | |
|---|---|---|---|
| f | 28.7998 | 43.9996 | 58.5001 |
| d14 | 8.1989 | 3.7922 | 1.7236 |
| Bf | 9.0778 | 24.8178 | 39.8331 |

| | | |
|---|---|---|
| $f_{L1} = -21.70$ | $f_{L12} = -1389.66$ | h = 21.6 |
| $f_1 = 18.83$ | $f_2 = 19.50$ | |

TABLE 3

(Third Embodiment)

Focal length f: 28.8–48.5.
Angle of view 2ω: 72.6°–47.8°.
Full length Dw at the wide angle end: 57.8.
Magnification change ratio Z: 1.68.
Shortest back focal length $Bf_{min}$: 7.40

| | r | d | ν | n |
|---|---|---|---|---|
| 1 | 28.780 | 1.00 | 52.3 | 1.74810 |
| 2 | 11.270 | 2.60 | | |
| 3 | 13.256 | 5.00 | 53.5 | 1.54739 |
| 4 | −140.173 | 2.10 | | |
| 5 | −17.493 | 3.40 | 57.5 | 1.67025 |
| 6 | −25.499 | 1.00 | | |
| 7 | −143.198 | 0.90 | 49.4 | 1.77279 |
| 8 | 10.344 | 5.60 | 60.7 | 1.56384 |
| 9 | −40.288 | 0.10 | | |
| 10 | 26.584 | 4.30 | 70.4 | 1.48749 |
| 11 | −10.323 | 1.50 | 39.8 | 1.86994 |
| 12 | −14.227 | 0.55 | | |
| 13 | −120.000 | 1.50 | 82.6 | 1.49782 |
| 14 | −36.074 | (variable) | | |
| 15 | −31.850 | 3.10 | 55.6 | 1.69680 |
| 16 | −14.800 | 1.90 | | |
| 17 | −13.005 | 1.90 | 60.1 | 1.62041 |
| 18 | −64.157 | 4.50 | | |
| 19 | −13.605 | 1.30 | 60.1 | 1.62041 |
| 20 | −100.951 | (Bf) | | |

| | | | |
|---|---|---|---|
| f | 28.8018 | 35.0025 | 48.5048 |
| d14 | 8.7904 | 6.4676 | 3.4642 |
| Bf | 7.4019 | 13.5812 | 27.0370 |

| | | |
|---|---|---|
| $f_{L1} = -25.38$ | $f_{L12} = 103.20$ | h = 21.6 |
| $f_1 = 19.47$ | $f_2 = -19.38$ | |

TABLE 4

(Fourth Embodiment)

Focal length f: 30.9–68.0.
Angle of view 2ω: 68.0°–35.2°.
Full length Dw at the wide angle end: 64.2.
Magnification change ratio Z: 2.20.
Shortest back focal length $Bf_{min}$: 10.04

| | r | d | ν | n |
|---|---|---|---|---|
| 1 | 45.942 | 1.50 | 45.4 | 1.79668 |
| 2 | 12.121 | 2.80 | | |

TABLE 4-continued (Fourth Embodiment)

Focal length f: 30.9–68.0.
Angle of view 2ω: 68.0°–35.2°.
Full length Dw at the wide angle end: 64.2.
Magnification change ratio Z: 2.20.
Shortest back focal length $Bf_{min}$: 10.04

| | | | | |
|---|---|---|---|---|
| 3 | 17.657 | 4.80 | 38.2 | 1.65128 |
| 4 | −101.245 | 2.50 | | |
| 5 | −21.118 | 4.20 | 40.9 | 1.79631 |
| 6 | −26.655 | 1.30 | | |
| 7 | 58.248 | 1.00 | 40.9 | 1.79631 |
| 8 | 9.148 | 5.20 | 46.5 | 1.58267 |
| 9 | −74.531 | 1.20 | | |
| 10 | 52.213 | 4.60 | 70.4 | 1.48749 |
| 11 | −10.095 | 2.00 | 25.4 | 1.80518 |
| 12 | −13.358 | 2.38 | | |
| 13 | −64.953 | 1.20 | 69.9 | 1.51860 |
| 14 | −36.663 | (variable) | | |
| 15 | −39.202 | 2.46 | 40.9 | 1.79631 |
| 16 | −15.799 | 1.76 | | |
| 17 | −15.013 | 1.10 | 53.9 | 1.71300 |
| 18 | −81.968 | 3.23 | | |
| 19 | −12.345 | 2.08 | 54.0 | 1.71300 |
| 20 | −60.583 | (Bf) | | |

| | | | |
|---|---|---|---|
| f | 30.9006 | 51.8215 | 68.0031 |
| d14 | 8.8777 | 3.9392 | 2.2035 |
| Bf | 10.0390 | 31.0844 | 47.3623 |

| | | |
|---|---|---|
| $f_{L1} = -21.08$ | $f_{L12} = 887.00$ | h = 21.6 |
| $f_1 = 19.38$ | $f_2 = 19.50$ | |

TABLE 5

(Fifth Embodiment)

Focal length f: 30.8–78.4.
Angle of view 2ω: 68.9°–30.8°.
Full length Dw at the wide angle end: 64.8.
Magnification change ratio Z: 2.55.
Shortest back focal length $Bf_{min}$: 8.82

| | r | d | ν | n |
|---|---|---|---|---|
| 1 | 44.830 | 1.50 | 43.3 | 1.84042 |
| 2 | 12.568 | 2.80 | | |
| 3 | 17.853 | 4.80 | 38.2 | 1.65128 |
| 4 | −87.166 | 2.50 | | |
| 5 | −18.522 | 4.20 | 40.9 | 1.79631 |
| 6 | −24.442 | 1.30 | | |
| 7 | 75.646 | 1.00 | 40.9 | 1.79631 |
| 8 | 12.252 | 5.20 | 46.4 | 1.58267 |
| 9 | −54.987 | 1.20 | | |
| 10 | 99.504 | 4.60 | 56.4 | 1.50137 |
| 11 | −8.938 | 2.00 | 25.3 | 1.80518 |
| 12 | −13.341 | 2.49 | | |
| 13 | −13.756 | 1.20 | 35.6 | 1.62536 |
| 14 | −45.843 | (variable) | | |
| 15 | −56.714 | 2.80 | 37.9 | 1.72342 |
| 16 | −17.838 | 1.90 | | |
| 17 | −18.646 | 1.20 | 39.8 | 1.86994 |
| 18 | −176.125 | 4.00 | | |
| 19 | −12.175 | 1.30 | 67.9 | 1.59319 |
| 20 | −50.151 | (Bf) | | |

| | | | |
|---|---|---|---|
| f | 30.7958 | 50.0820 | 78.4299 |
| d14 | 9.9437 | 4.6937 | 1.6637 |
| Bf | 8.8187 | 28.1235 | 56.4987 |

| | | |
|---|---|---|
| $f_{L1} = -21.23$ | $f_{L12} = -473.19$ | h = 21.6 |
| $f_1 = 20.48$ | $f_2 = 20.50$ | |

The condition-corresponding values of each embodiment of the present invention will be shown in Table 6 below.

TABLE 6

(Condition-Corresponding Values)

| Embodiment | 1 | 2 | 3 | 4 | 5 |
|---|---|---|---|---|---|
| $\dfrac{Z}{|f_{L1}|}$ | 0.12 | 0.09 | 0.07 | 0.10 | 0.12 |

TABLE 6-continued (Condition-Corresponding Values)

| Embodiment | 1 | 2 | 3 | 4 | 5 |
|---|---|---|---|---|---|
| $n_{L1}$ | 1.7967 | 1.7967 | 1.7481 | 1.7967 | 1.8404 |
| $\frac{f_1}{h}$ | 0.90 | 0.90 | 0.90 | 0.90 | 0.95 |
| $\frac{f_2}{h}$ | 0.87 | 0.87 | 0.90 | 0.90 | 0.95 |
| $\frac{f_w}{f_{L12}}$ | 0.047 | 0.021 | 0.280 | 0.035 | 0.065 |
| $\nu_{L1}$ | 45.37 | 45.37 | 52.30 | 45.37 | 45.30 |
| $\frac{r_b - r_a}{r_b - r_a}$ | −1.612 | −1.734 | −2.287 | −1.717 | −1.779 |

In the respective embodiments shown in Tables 1–5, a wide angle and a high zoom ratio are achieved, and yet a compact shape and a long back focal length are maintained. Particularly, in the first embodiment shown in Table 1, it can be understood that the full length at the wide angle end is compactly minimized to 63.7, but nevertheless a high zoom ratio in which the magnification change ratio (zoom ratio) amounts to as great as 2.4 and a high wide angle in which the angle of view at the wide angle end amounts to as great as 73° are realized at the same time.

For the focusing on an object at a close distance, the first lens unit may be axially forwardly moved as a unit, or the lenses in the first lens unit which are more adjacent to the object side than the stop S may be axially forwardly moved as a unit.

While in each embodiment, the negative meniscus lens $L_1$ in the first lens unit $G_1$ which is disposed most adjacent to the object side is constructed of a negative single lens, this negative meniscus lens $L_1$ may be constructed of a positive lens and a negative lens cemented together.

What is claimed is:

1. A compact wide-angle zoom lens which has, in succession from the object side, a first lens unit $G_1$ of positive refractive power and a second lens unit $G_2$ of negative refractive power and in which a magnification change is effected by the relative unit spacing between said two lens units being varied, characterized in that said first lens unit has at least two negative lens components and at least one positive lens component, and one of said at least two negative lens components is disposed most adjacent to the object side of said first lens unit $G_1$, and has a negative meniscus shape having its convex surface facing the object side, and characterized in that when the magnification change ratio of said wide-angle zoom lens is Z and the focal length of said negative meniscus lens component $L_1$ is $F_{L1}$, $$Z/|f_{L1}|>0.06 \tag{1}$$

is satisfied.

2. A compact wide-angle zoom lens according to claim 1, characterized in that when the refractive index of said negative meniscus lens component $L_1$ is $n_{L1}$, $$n_{L1}<1.7 \tag{2}$$

is satisfied.

3. A compact wide-angle zoom lens according to claim 2, characterized in that when the maximum image height of said wide-angle zoom lens is h and the focal length of said first lens unit $G_1$ is $f_1$ and the focal length of said second lens unit $G_2$ is $f_2$, $$0.5<f_1/h<1.1 \tag{3}$$

$$0.5<|f_2|/h<1.1 \tag{4}$$

are satisfied.

4. A compact wide-angle zoom lens which consists of, in succession from the object side, a first lens unit $G_1$ of positive refractive power and a second lens unit $G_2$ of negative refractive power, in which a magnification change is performed by the relative unit spacing between said two lens units being varied, said first lens unit $G_1$ including a negative lens component $L_1$ disposed most adjacent to the object side and said negative lens component $L_1$ having a meniscus shape with its convex surface facing the object side, and which satisfies the following condition:

$$Z/|f_{L1}|>0.06$$

wherein Z is the magnification change ratio of said wide-angle zoom lens and $F_{L1}$ is the focal length of said negative lens component $L_1$.

5. A compact wide-angle zoom lens according to claim 4, which satisfies the following condition:

$$n_{L1}<1.7$$

wherein $n_{L1}$ is the refractive index of said negative lens component $L_1$.

6. A compact wide-angle zoom lens according to claim 5, which satisfies the following conditions:

$$0.5<f_1/h<1.1$$

$$0.5<|f_2|/h<1.1$$

wherein h is the maximum image height of said wide-angle zoom lens, $F_1$ is the focal length of said first lens unit $G_1$ and $F_2$ is the focal length of said second lens unit $G_2$.

7. A compact wide-angle zoom lens according to claim 6, wherein said first lens unit $G_1$ includes a positive lens component $L_2$ disposed at the image side of said negative lens component $L_1$ and which satisfies the following condition:

$$f_w/|f_{L12}|<0.3$$

wherein $f_w$ is the focal length of said wide-angle zoom lens at the wide angle end thereof, and $f_{L12}$ is the combined focal length of said negative lens component $L_1$ in said first lens unit $G_1$ and said positive lens component $L_2$ positioned at the image side of said negative lens component $L_1$.

8. A compact wide-angle zoom lens according to claim 7, which satisfies the following condition:

$$\nu_{L1}>37$$

wherein $\nu_{L1}$ is the Abbe number of said negative lens component $L_1$.

9. A compact wide-angle zoom lens according to claim 7, which satisfies the following condition:

$$-5.0 < \frac{r_b - r_c}{r_b - r_a} < -1.2$$

wherein $r_a$ is the radius of curvature of a lens surface of said negative lens component $L_1$ which is most adjacent to the object side and $r_b$ is the radius of curvature of a lens surface of said negative lens component $L_1$ which is most adjacent to the image side.

* * * * *